United States Patent
Wang

(10) Patent No.: US 8,351,662 B2
(45) Date of Patent: Jan. 8, 2013

(54) SYSTEM AND METHOD FOR FACE VERIFICATION USING VIDEO SEQUENCE

(75) Inventor: Jie Wang, Markham (CA)

(73) Assignee: Seiko Epson Corporation, Tokyo (JP)

( * ) Notice: Subject to any disclaimer, the term of this patent is extended or adjusted under 35 U.S.C. 154(b) by 283 days.

(21) Appl. No.: 12/883,931

(22) Filed: Sep. 16, 2010

(65) Prior Publication Data
US 2012/0070041 A1 Mar. 22, 2012

(51) Int. Cl.
*G06K 9/00* (2006.01)
(52) U.S. Cl. .................................................. 382/118
(58) Field of Classification Search .......... 382/115, 382/117, 178; 348/77, 78
See application file for complete search history.

(56) References Cited

U.S. PATENT DOCUMENTS

| | | | |
|---|---|---|---|
| 6,128,398 A | 10/2000 | Kuperstein et al. | |
| 7,643,658 B2 | 1/2010 | Kilner et al. | |
| 2003/0040925 A1 | 2/2003 | Gutta et al. | |
| 2004/0017933 A1 | 1/2004 | Lestideau | |
| 2008/0226139 A1* | 9/2008 | Suzuki et al. | 382/117 |
| 2009/0079822 A1* | 3/2009 | Yoo et al. | 348/77 |

* cited by examiner

*Primary Examiner* — Brian Le

(57) ABSTRACT

Face verification is performed using video data. The two main modules are face image capturing and face verification. In face image capturing, good frontal face images are captured from input video data. A frontal face quality score discriminates between frontal and profile faces. In face verification, a local binary pattern histogram is selected as the facial feature descriptor for its high discriminative power and computational efficiency. Chi-Square ($\chi^2$) distance between LBP histograms from two face images are then calculated as a face dissimilarity measure. The decision whether or not two images belong to the same person is then made by comparing the corresponding distance with a pre-defined threshold. Given the fact that more than one face images can be captured per person from video data, several feature based and decision based aggregators are applied to combine pair-wise distances to further improve the verification performance.

20 Claims, 11 Drawing Sheets

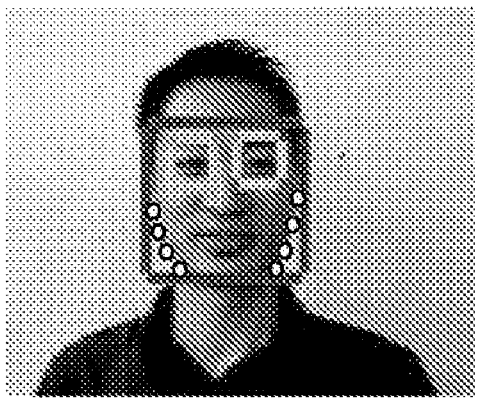
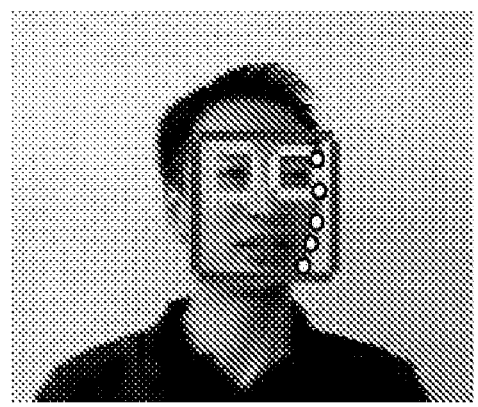
FIG. 5A                    FIG. 5B

Rotate and Scale

SYSTEM AND METHOD FOR FACE VERIFICATION USING VIDEO SEQUENCE

CROSS-REFERENCE TO RELATED APPLICATIONS

U.S. patent application Ser. No. 12/402,761, filed Mar. 12, 2009, now U.S. Pat. No. 8,224,042, is hereby incorporated by reference in its entirety.

BACKGROUND

Field of Invention

Surveillance video cameras are being widely used in public places such as stores, buildings, streets and even private places such as private residences, back yards, and driveways. As a result, the demanding task of video analysis has attracted more attention and research. Video based face verification is an important research area due to its wide range of practical applications including, but not limited to, forensic identification, access control, and human computer interface.

Traditional face recognition systems recognize/verify a person's identity based on a limited number of image samples. Video based face verification is different in that a large number of face samples collected from video sequences are usually available to the video based system. Although more information leads to better performance theoretically, two questions are naturally raised. First, how does one select "good" face samples from a large number of video frames; second, how does one use multiple samples per person for better verification performance.

SUMMARY OF INVENTION

The present invention addresses the above noted problems to enable verification of face identities through video sequences. Two aspects of the proposed system are summarized as follows.

First, an effective edge-based feature is proposed to select good frontal face images. It has been shown empirically that the recognition/verification accuracy deteriorates dramatically when the range of pose variations increases. Therefore, to ensure a good verification performance, frontal face images are captured. Each person to be recognized is then represented by a set of frontal face images.

Second, a system flow performs face verification, which combines the strengths of a local binary pattern, a support vector machine, and a multiple classifier system. Local binary pattern (LBP) has been adopted to represent human faces due to its high discriminative power and low computational cost. Due to the observation that different facial areas have different contributions to the recognition/verification performance, a weighted LBP solution is utilized in the present invention by using a support vector machine technique. After extracting LBP features, a similarity measure of any pair-wise face comparison between two image sets is calculated. The finial decision that two image sets belong to the same person or not is then made by combining all computed similarity values.

The present invention can be applied to different application scenarios. One example scenario can be described as follows, which is denoted as "customer fraud behavior detection". In this scenario, face verification software is trying to detect if the customer who is asking for a refund in a store is the same person who made the corresponding purchase. A video camera is installed in the counter area. The system captures face images of the customer requesting a refund from the camera and compares those images with saved images that were captured during a previous purchase transaction. If the system decides that the customer who is asking for a refund is not the person who made the purchase, a warning signal indicating a "fraud behavior" will be sent to store manager/staff for further attention.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIGS. 5A and 5B illustrate a contour observation in frontal and profile faces, respectively;

DESCRIPTION OF THE PREFERRED EMBODIMENTS

Figure 1:
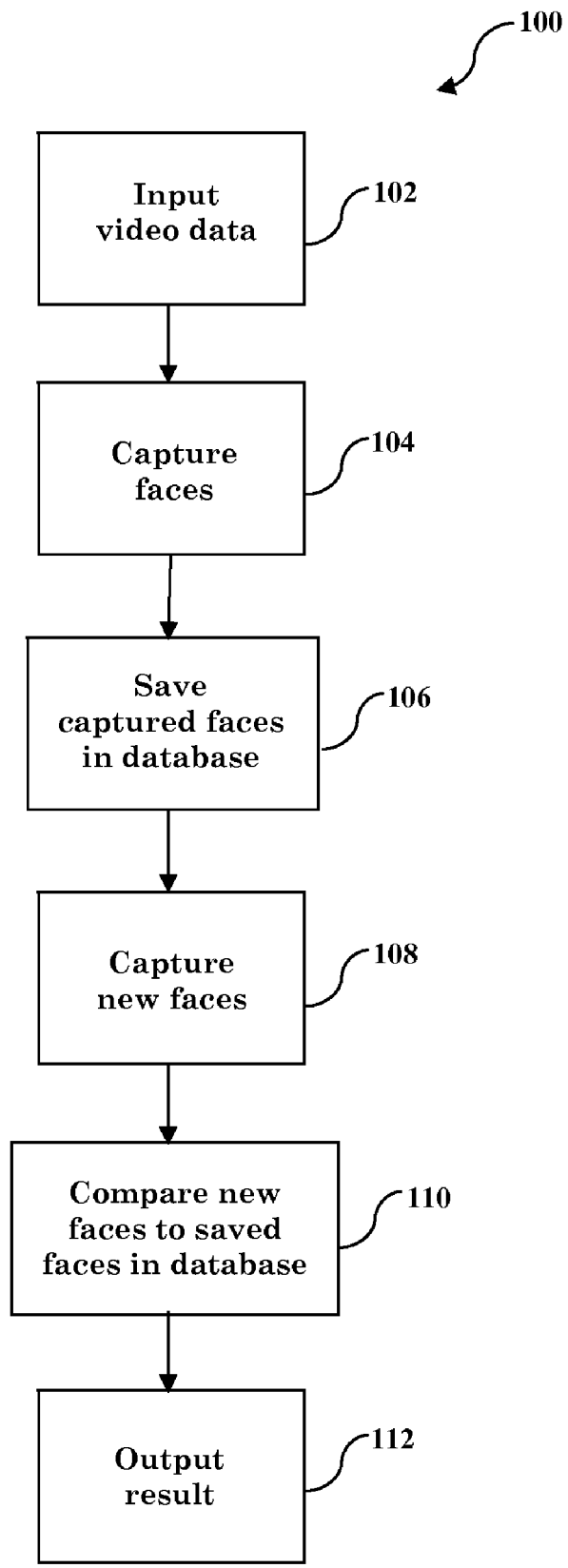
FIG. 1 is a flowchart of the general method of the present invention.

In the following detailed description, reference is made to the accompanying drawings that show, by way of illustration, example embodiments of the invention. In the drawings, like numerals describe substantially similar components throughout the several views. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

In general, example embodiments relate to methods, devices, and computer-readable media for detecting facial images in video, selecting images for storage and comparing new images to the stored images. Example embodiments can be used in conjunction with identification systems to detect particular faces of interest, e.g. for customer identification or law enforcement purposes.

Example embodiments capture images, detect features representing a face, determine face candidates, and output the best candidates for storage or comparison. Methods consistent with the invention may be implemented in image capture devices such as scanners or digital cameras, as well as in software modules including printer drivers or image editing software, among other things.

With reference now to FIG. 1, an example method 100 for face detection is disclosed. Generally, the example method 100 identifies objects in the image and determines whether the objects are candidate face objects. Each candidate face object may then be eliminated or retained as a candidate by sorting the candidates by their quality score and then storing the faces with the best score in a database. Subsequently, new input faces are compared with those in the database and the result, match or no match, are output to an output device such as a display (computer screen), printer, projector, etc.

The example method 100 and variations thereof disclosed herein can be implemented using non-transitory computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store program code in the form of computer-executable instructions or data structures and that can be accessed by a processor of a general purpose or special purpose computer. Combinations of the above should also be included within the scope of computer-readable media.

Computer-executable instructions comprise, for example, instructions and data that cause a processor of a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

Examples of special purpose computers include image processing devices such as digital cameras (an example of which includes, but is not limited to, the Epson R-D1 digital camera manufactured by Seiko Epson Corporation headquartered in Owa, Suwa, Nagano, Japan), digital camcorders, projectors, printers, scanners, copiers, portable photo viewers (examples of which include, but are not limited to, the Epson P-3000 or P-5000 portable photo viewers manufactured by Seiko Epson Corporation), or portable movie players, or some combination thereof, such as a printer/scanner/copier combination (examples of which include, but are not limited to, the Epson Stylus Photo RX580, RX595, or RX680, the Epson Stylus CX4400, CX7400, CX8400, or CX9400Fax, and the Epson AcuLaser® CX11NF manufactured by Seiko Epson Corporation) or a printer/scanner combination (examples of which include, but are not limited to, the Epson TM-J9000, TM-J9100, TM-J7000, TM-J7100, and TM-H6000III, all manufactured by Seiko Epson Corporation) or a digital camera/camcorder combination. An image processing device may include a face detection capability, for example, to detect (recognize/verify) a face in an image. For example, an image capture device, such as a camera or scanner, with this face detection capability may include one or more computer-readable media that implement the example method 100. Alternatively, a computer connected to the image capture device may include one or more computer-readable media that implement the example method 100.

Figure 2:
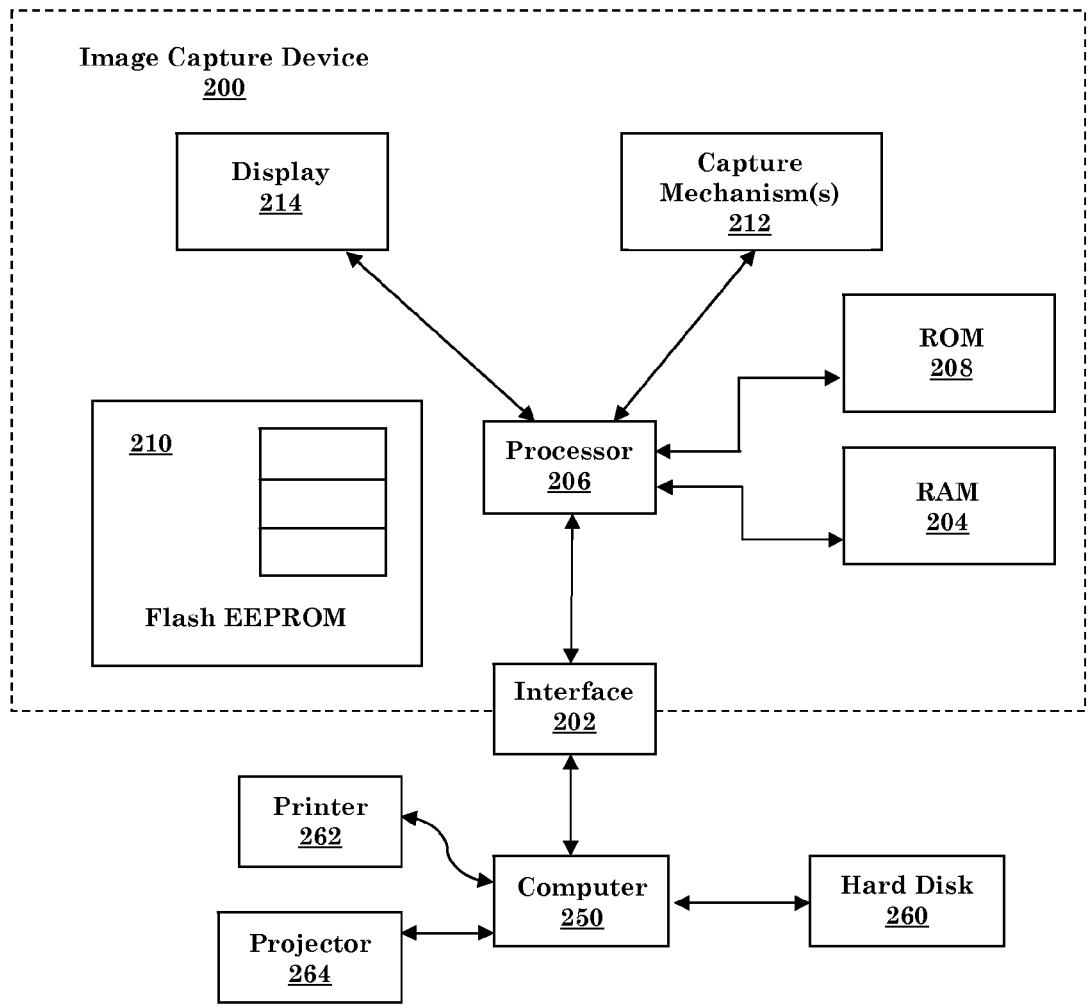
FIG. 2 is a general block diagram of an image capture device and system for utilizing the present invention.

A schematic representation of an example image capture device 200 is disclosed in FIG. 2. The example image capture device 200 exchanges data with a host computer 250 by way of an intervening interface 202. Application programs and an image capture device driver may also be stored for access on the host computer 250. When an image retrieve command is received from the application program, for example, the image capture device driver controls conversion of the command data to a format suitable for the image capture device 200 and sends the converted command data to the image capture device 200. The driver also receives and interprets various signals and data from the image capture device 200, and provides necessary information to the user by way of the host computer 250.

When data is sent by the host computer 250, the interface 202 receives the data and stores it in a receive buffer forming part of a RAM 204. The RAM 204 can be divided into a number of sections, for example through addressing, and allocated as different buffers, such as a receive buffer or a send buffer. Data, such as digital image data, can also be obtained by the image capture device 200 from the capture mechanism(s) 212, the flash EEPROM 210, or the ROM 208. For example, the capture mechanism(s) 212 can generate a digital photographic video or still image. This digital image can then be stored in the receive buffer or the send buffer of the RAM 204.

A processor 206 uses computer-executable instructions stored on a ROM 208 or on a flash EEPROM 210, for example, to perform a certain function or group of functions, such as the method 100 for example. Where the data in the receive buffer of the RAM 204 is a digital image, for example, the processor 206 can implement the methodological acts of the method 100 on the digital image to detect a face in the digital image. Further processing in an imaging pipeline may then be performed on the digital image before the image is displayed by the image capture device 200 on a display 214, such as an LCD display for example, or transferred to the host computer 250, for example.

The example method 100 for detecting a face in an image will now be discussed in connection with FIG. 1. Prior to performing method 100, an input image can be targeted for various image processing operations. The targeted input image may be a digital color image or a digitized or scanned version of a color image. Various image processing techniques may be applied to the targeted input image before method 100 is performed.

Method 100 can be divided generally into two stages: registration, steps 102-106; and verification, steps 108-112.

Figure 3:
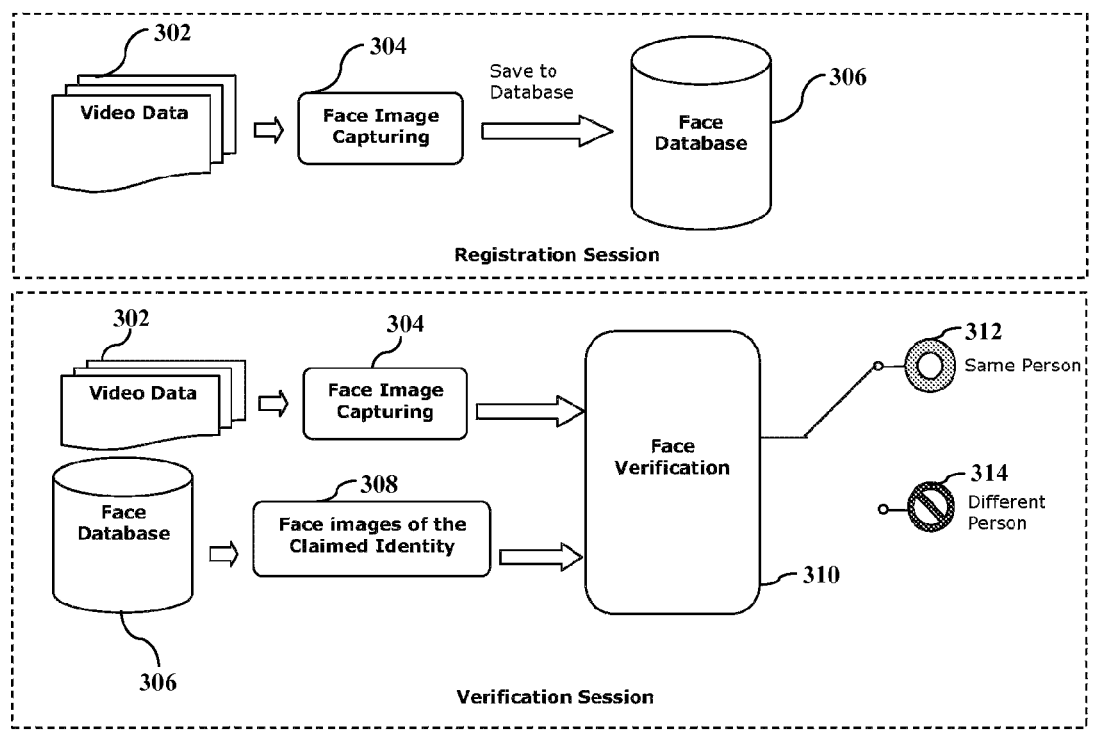
FIG. 3 is a general block diagram of the registration and verification aspects of the present invention.

FIG. 3 depicts the two stages with a Registration session and a Verification session.

During a registration session (e.g., purchase transaction in customer fraud behavior detection scenario), good frontal face images will be captured by a face image capturing module 304 from video clips (video data 302) and saved to face database 306 associated with a unique subject ID. Those captured images will be used to represent the person of interest, such as the customer who is making the purchase. The video data 302 can be input through one of the capture mechanisms 212, such as a video camera installed proximate to the store cash register, for example. The face image capturing module 304, to be described later in detail with reference to FIG. 4 can be implemented using processor 206 operating under instructions stored in ROM 208, for example. The face database 306 can be part of RAM 204 or an external storage device such as a hard disk 260 connected to computer 250.

During a verification session (e.g., the time when a customer is asking for a refund), face image capturing module 304 again captures frontal face images from video clips (video data 302). At the same time, face images 308 of the claimed identity (e.g., face images of the corresponding purchaser according to the receipt) are retrieved from face database 306. These two sets of images are then compared by face verification module 310 and a decision is made whether they belong to the same person 312 or not 314. The face verification module 310, to be described later in detail, can be implemented using processor 206 operating under instructions stored in ROM 208, for example. The decision 312 or 314 is output to an output device such as display 214, the screen of computer 250, printer 262 and/or projector 264 connected to computer 250, etc. This output (decision) can then be viewed by the store clerk, manager and/or security personnel, for example.

The two major modules, face image capturing module 304 and face verification module 310 will be described in the following sections.

Face Image Capturing Module

The purpose of the face image capturing module 310 is to capture one or more good face images from the video data 302 to represent the subject. It has been shown in various published studies that pose variation is one of the most important factors affecting face verification accuracy. The performance deteriorates dramatically when the range of pose variations increases. Therefore, to ensure a good verification performance, frontal face images are captured.

Figure 4:
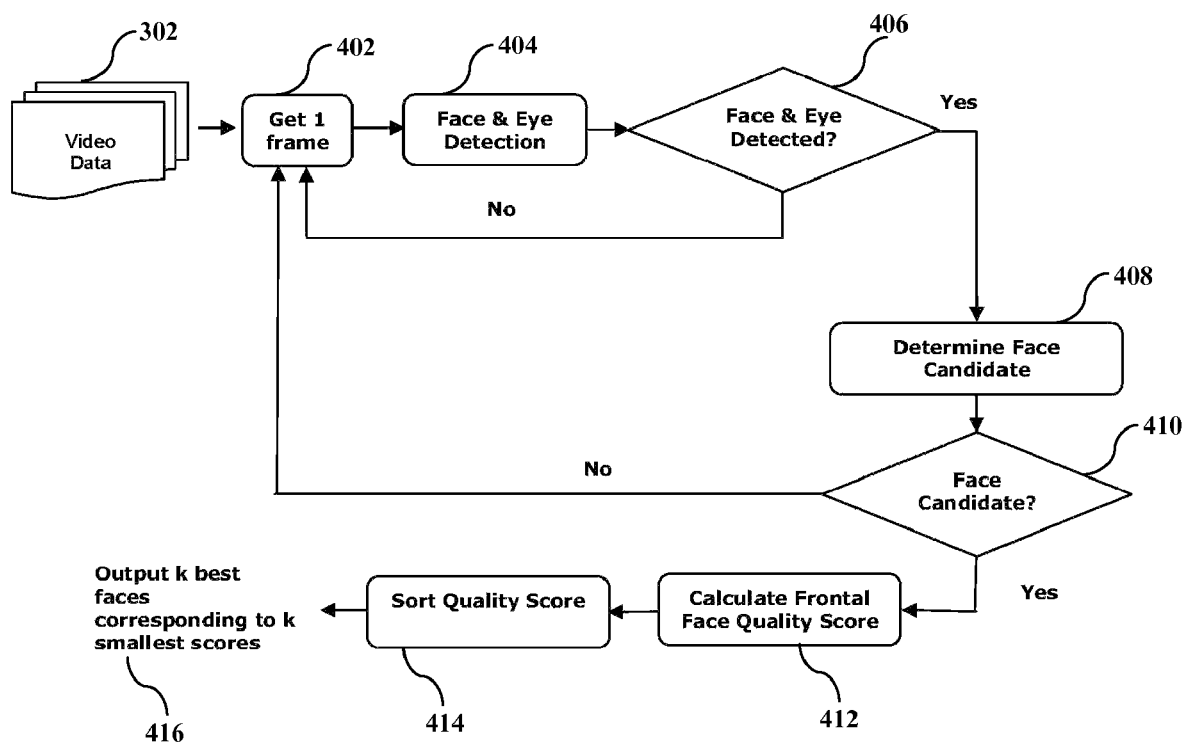
FIG. 4 is a flowchart of the face image capturing module of the present invention.

The flow diagram of the face image capturing module 304 is depicted in FIG. 4. For each frame 402, face image capturing module 304 will firstly detect face and eye locations (block 404). There are several conventional methods for detecting a face and eyes in an image. The present invention is not concerned with or limited any particular face/eye detection method or algorithm. However, one such method is described in my application, commonly assigned U.S. patent application Ser. No. 12/402,761, filed Mar. 12, 2009, U.S. Pat. No. 8,224,042, which is hereby incorporated by reference in its entirety.

If a face and eye are not detected in a frame (step 406 returns No), the process loops back to step 402 to get the next frame. This loop continues until there are no more frames in the video data 302, at which point the process will end. If a face and eye are detected in a frame (step 406 returns Yes), that frame is passed on to step 408 to determine if the face/eye that was detected is a face candidate for the present invention. Only faces that satisfy certain criteria are considered from a subject of interest, not those just passing by. Those faces are denoted as face candidates (step 410 returns Yes). Then the present invention further examines the selected face candidate by calculating a frontal face quality score (step 412). The best k face images are then obtained as those with k smallest scores, where k≧1 (step 414). The best faces are then output for storage in the registration session or comparison in the verification session. If a face candidate is not detected in step 408 (step 410 returns No), the process loops back to step 402 to get the next frame. This loop continues until there are no more frames in the video data 302, at which point the process will end.

Two main steps: (1) determine face candidate (step 408) and (2) calculate frontal face quality score (step 412) will be detailed in the following sections.

Determine Face Candidate (Step 408)

In a store environment, for example, the video camera (capture mechanism 212) may capture faces from persons who are just passing by the camera. Therefore, it is important to determine if the captured face is that of interest, e.g., from an actual customer in transaction. In the present invention, the determination of whether or not the input face is a face candidate is based on certain criteria.

In the present invention, a face rectangle is defined as $\{x_f, y_f, h_f, w_f\}$, where $\{x_f, y_f\}$ are the coordinates of a left top point, $\{h_f, w_f\}$ are the height and width of the face rectangle, respectively, left and right eyes of the face are defined as $\{x_{le}, y_{le}, h_{le}, w_{le}\}$ and $\{x_{re}, y_{re}, h_{re}, w_{re}\}$ respectively, with $\{x_{le}, y_{le}\}$, $\{x_{re}, y_{re}\}$ being the coordinates of left top points of the left and right eyes, respectively, and $\{h_{le}, w_{le}\}$, $\{h_{re}, w_{re}\}$ being the height and width of the left and right eyes, respectively, and $\{h_I, w_I\}$ denotes the height and width of the image, respectively, and the face criteria of the present invention are set as follows:

(1) the face should appear in the middle of the image, i.e., $x_f \geq \theta_l \times w_I$, $x_f + w_f \leq \theta_r \times w_I$, $y_f \leq \theta_t \times h_I$, $y_f + h_f \leq \theta_b \times h_I$, where $0 \leq \theta_l, \theta_r, \theta_t, \theta_b \leq 1$ and $\theta_l, \theta_r, \theta_t, \theta_b$ are four pre-defined thresholds. In an exemplary embodiment, $\theta_l=0.25$, $\theta_r=0.75$, $\theta_t=0.25$, $\theta_b=0.75$;

(2) the face should be sufficiently large, i.e., $\min(h_f, w_f) \geq \theta_s \times \min(h_I, w_I)$, $\theta_s$ is a pre-defined threshold and set to 0.1 in an exemplary embodiment;

(3) the two eyes should be located in a horizontal line, i.e., $|y_{le} - y_{re}| \leq \max(\min(h_{le}, h_{re}) \times \gamma_1, 3)$ where $\gamma_1$ is a pre-defined threshold which is set to 0.05 in an exemplary embodiment;

(4) the two eyes should have similar size, i.e., $|w_{le} - w_{re}| \leq \max(\min(w_{le}, w_{re}) \times \gamma_2, 3)$, where $\gamma_2$ is a pre-defined threshold which is set to 0.15 in an exemplary embodiment;

(5) distance of two eyes should be within a range, i.e., $w_f \times \gamma_3 < |x_{lc}^c - x_{rc}^c| < w_f \times \gamma_4$, where $x_{lc}^c$, $x_{rc}^c$ are x-coordinates of the left and right eye rectangle center points, and $\gamma_3$ and $\gamma_4$ are pre-defined thresholds which are set to 0.25 and 0.6, respectively, in an exemplary embodiment;

(6) size of the two eyes should be within a range, i.e., $\min(w_{le}, w_{re}) \geq w_f \times \gamma_5$, $\max(w_{le}, w_{re}) \leq w_f \times \gamma_6$, where $\gamma_5$ and $\gamma_6$ are pre-defined thresholds which were set to 0.2 and 0.45, respectively, in an exemplary embodiment;

and (7) the two eyes should be located in the middle of the face, i.e., $x_f + w_f - x_{re} - w_{re} \geq w_{re} \times \gamma_7$, $x_{le} - x_f \geq w_{le} \times \gamma_8$, where $\gamma_7$ and $\gamma_8$ are pre-defined thresholds which were set to 0.3 and 0.3, respectively, in an exemplary embodiment.

Calculate Frontal Face Quality Score (Step 412)

To capture frontal faces, the present invention comprises a simple but effective feature that discriminates between frontal and profile faces. The feature was developed based on the observation that in a profile face, only one side (left or right) of the face contour is included in the detected face rectangle while in frontal faces, usually the left and right contours appear equally in the face rectangle. FIGS. 5A and 5B demonstrate this observation. In the frontal image shown in FIG. 5A both the left and right contours appear. Whereas in the profile image shown in FIG. 5B, only one contour appears.

Based on the above observation, a novel feature, denoted as frontal face quality score S is defined as $$S = \frac{N}{h_f}$$

where $h_f$ denotes the height of face rectangle and N denotes the number of rows where a face contour can be found in only one of the left and right parts of the face rectangle. The detailed definition is as follows:

$$N = \sum_{y=y_f}^{y_f+h_f} |b_{contour}^L(y) - b_{contour}^R(y)|, \text{ where}$$

$$b_{contour}^L(y) = \begin{cases} 1 & \text{if } \sum_{x=x_f}^{x_f+\alpha_1 \times w_f} Edge_{R|G|B}(x,y) > 0 \\ 0 & \text{if } \sum_{x=x_f}^{x_f+\alpha_1 \times w_f} Edge_{R|G|B}(x,y) = 0, \end{cases}$$

and $$b_{contour}^R(y) = \begin{cases} 1 & \text{if } \sum_{x=x_f+w_f-\alpha_2 \times w}^{x_f+w_f} Edge_{R|G|B}(x,y) > 0 \\ 0 & \text{if } \sum_{x=x_f+w_f-\alpha_2 \times w}^{x_f+w_f} Edge_{R|G|B}(x,y) = 0 \end{cases}$$

where $Edge_{R|G|B}(x,y) = Edge_R(x,y) | Edge_G(x,y) | Edge_B(x,y)$ denotes the binary edge map obtained by combining binary "vertical" edge maps from R, G, and B channels, and "|" denotes an "OR" operator. $\alpha_1$, $\alpha_2$ are two pre-defined constants defining the left and right rectangle range, respectively. In an exemplary embodiment, $\alpha_1$, $\alpha_2$ are set to 0.3.

Figure 6A:
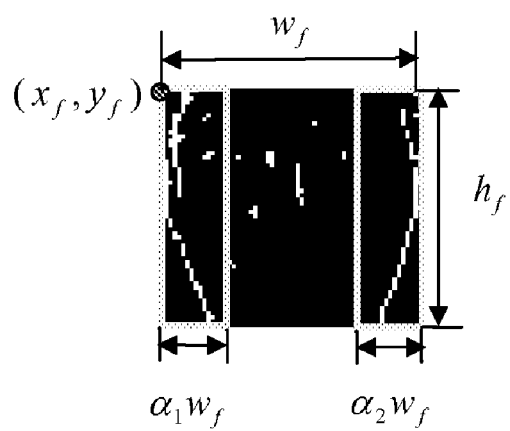
FIG. 6A illustrates the edge map of a frontal face and FIG. 6B illustrates the edge map of a profile face.
Figure 6B:
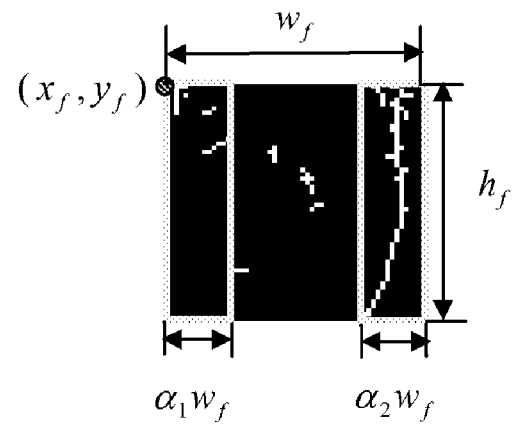

FIGS. 6A and 6B illustrate parameters in the forgoing detailed definition with FIG. 6A illustrating the edge map of a frontal face and FIG. 6B illustrating the edge map of a profile face.

Face Verification Module

Figure 7:
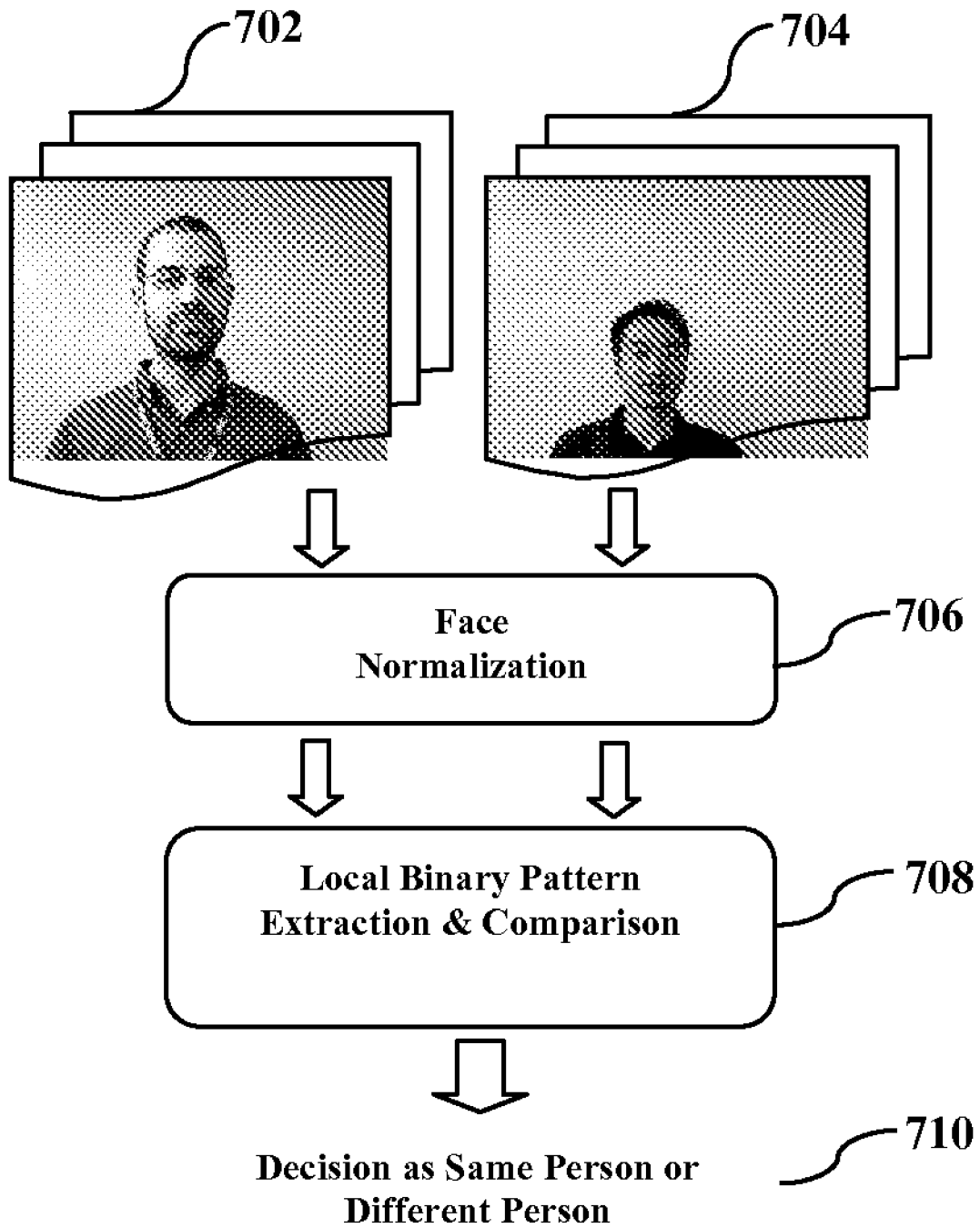
FIG. 7 depicts the system flow of face verification module.

The purpose of face verification module 310 is to determine whether or not two face images belong to the same person. FIG. 7 depicts the system flow of face verification module 310.

Face Normalization

Figure 8:
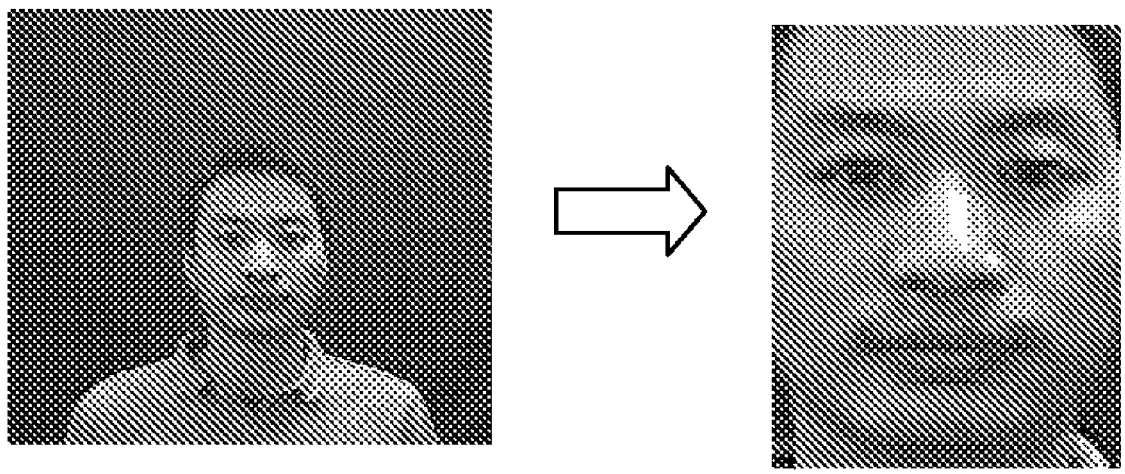
FIG. 8 illustrates the face normalization result.

In order to deal with images of faces with different sizes and different in-plane rotations, a face normalization procedure is firstly applied to align face patterns to the same size. In FIG. 7, face images 702 are from face database 306 and face images 704 are from face image capturing 304, or vice versa, in the verification session depicted in FIG. 3. Currently, only gray scale images are considered without taking color information into account. All color images are thus firstly transformed into gray scale images by taking the luminance component in YCbCr color space. Face images are then rotated and scaled (step 706) so that the centers of the eyes are placed on specific pixels and the image size is normalized to a specific size, e.g., 80×60 in a preferred embodiment. FIG. 8 illustrates the face normalization result.

Local Binary Pattern Extraction and Comparison (Step 708)

Local Binary Pattern (LBP) is a texture descriptor that codifies local primitives (such as curved edges, spots, flat areas, etc) into a feature histogram. It has attracted attention in face recognition due to its high discriminative power, tolerance against illumination changes and computational simplicity. Thus, it is utilized in an exemplary embodiment of the present invention to represent a face object.

Figure 9:
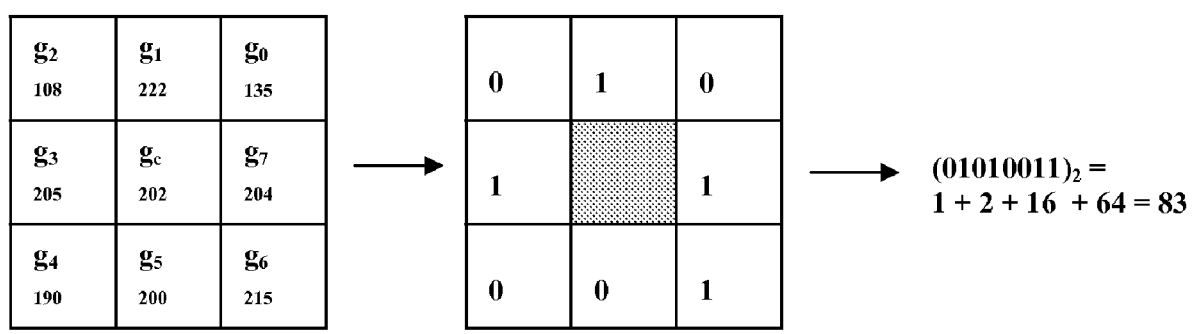
FIG. 9 illustrates the basic idea of LBP feature extraction.

The basic idea of LBP feature extraction is illustrated in FIG. 9. For a given pixel $g_c$, LBP is defined as an ordered set of binary comparisons of pixel intensities between the center pixel and its surrounding pixels (e.g., 8 neighboring pixels, $g_0, \ldots, g_7$ in a 3×3 square neighborhood as shown in FIG. 9).

Figure 10:
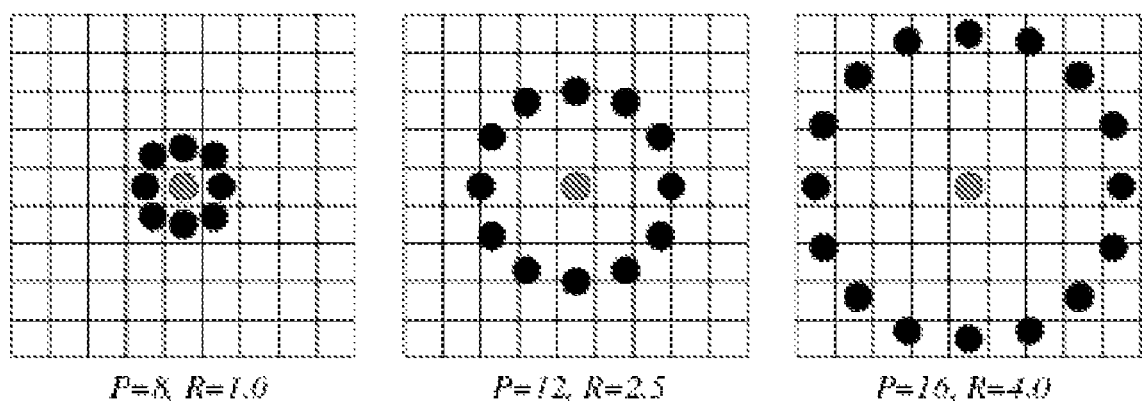
FIG. 10 illustrates three circular LBPs, each with a different radius and number of neighboring pixels.

The decimal form of the resulting 8-bit word (LBP code) is then obtained as the LBP feature value of the given pixel. For a given image block, a histogram of the LBP features is then calculated as the feature representation. The 3×3 square neighborhood in FIG. 9 can be further extended to a circular neighborhood defined as $LBP_{P,R}$, where "P" denotes the number of neighboring pixels and "R" denotes the radius. Three circular LBPs, each with a different radius and number of neighboring pixels are shown in FIG. 10. In an exemplary embodiment of the present invention, $LBP_{8,3}$ is used.

Figure 11:
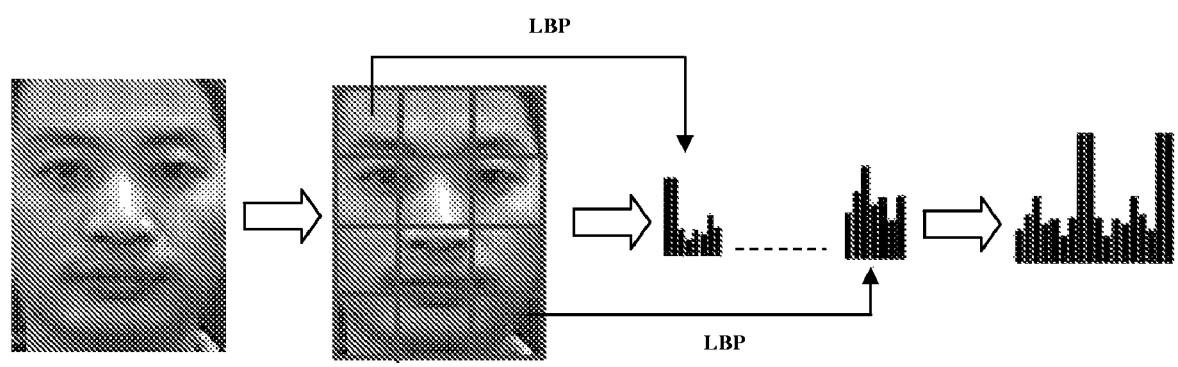
FIG. 11 illustrates an LBP histogram of a normalized face.

For face recognition/verification, each normalized face image is firstly divided into L×M blocks. LBP histogram is then calculated for each block, denoted as $H^i$, $i=1, \ldots, L \times M$ The face is then represented as the concatenated histogram obtained from each block, denoted as $H=[H^1, H^2, \ldots, H^{L \times M}]$ FIG. 11 depicts the procedure to calculate an LBP histogram from a face image.

For any two face images $I_1$, $I_2$ to be compared, their LBP histograms are firstly calculated, denoted as $H_1$, $H_2$. Let $H(l)$ denote the count of $l^{the}$ bin of the histogram, the dissimilarity of two face images $I_1$, $I_2$ is defined as the Chi-Square ($\chi^2$) distance between two LBP histograms, denoted as $D(I_1, I_2)$ $$D(I_1, I_2) = \begin{cases} \sum_{l=1}^{Q} \frac{(H_1(l) - H_2(l))^2}{H_1(l) + H_2(l)} & \text{if } H_1(l) + H_2(l) \neq 0 \\ 0 & \text{otherwise,} \end{cases}$$

where Q denotes the total number of bins of the histogram.

$D(I_1, I_2)$ is then compared with a pre-defined threshold T and a decision is then made that face images of $I_1$, $I_2$ belong to a same person if $D(I_1, I_2) \leq T$, otherwise the face images belong to different people. In an exemplary embodiment of the present invention, T is set to 4.5 with L=4 and M=3.

Weighted LBP

One extension of the above discussed LBP method for face recognition/verification tasks is weighted LBP. It is not difficult to understand that different face regions (blocks) have different impacts on recognition performance. For example, facial regions such as eye, mouth usually contain more information than those in the cheek areas. Therefore, it is reasonable to have a weighted LBP histogram by giving different weights to each block histograms, denoted as $H=[w^1 H^1, w^2 H^2, \ldots, w^{L \times M} H^{L \times M}]$.

The weighting vector $w=[w^1, w^2, \ldots, w^{L \times M}]^T$ can be obtained empirically based on human a priori knowledge or through a learning method. In an exemplary embodiment of the present invention, a support vector machine (SVM) technique is applied to obtain w from training samples. Let $Z=\{x_i, y_i\}_{i=1}^N$ be the training set containing N samples, each of which is associated with a class label $y_i \in \{-1, +1\}$, where "+1" denotes same person class $\omega_{same}$ and "-1" denotes different person class $\omega_{diff}$.

Each sample $x_i = [x_1^i, x_2^i, \ldots, x_{L \times M}^i]^T$ is represented by an L×M-dimensional column vector where vector component $x_j$ corresponds to Chi-Square ($\chi^2$) distance between two LBP histograms in $j^{th}$ block, i.e., $$x_j = D^j(I_1, I_2) = \begin{cases} \sum_{l=1}^{Q} \frac{(H_1^j(l) - H_2^j(l))^2}{H_1^j(l) + H_2^j(l)} & \text{if } H_1^j(l) + H_2^j(l) \neq 0 \\ 0 & \text{otherwise.} \end{cases}$$

-continued

If $(I_1, I_2)$ belong to same person, the corresponding label $y_i=+1$, otherwise $y_i=-1$. Then a linear SVM is applied to obtain the weighting vector w.

A linear SVM classifier seeks the best hyperplane ($w^Tx+b=0$) which can separate positive and negative examples, where w is normal to the hyperplane, $|b|/\|w\|$ is the perpendicular distance from the hyperplane to the origin and $\|w\|$ is the Euclidean norm of w. Thus, an unknown sample x will be classified to positive (same person) class if $w^Tx+b\geq 0$ or negative (inter-subject) class if $w^Tx+b\leq 0$. The M+1 parameters $w=[w_1, w_2, \ldots, w_M]^T$ and b can then be obtained through a traditional SVM training process. Thus the final distance (dissimilarity) between two face images $I_1, I_2$ is calculated as $$D(I_1, I_2) = \sum_{j=1}^{L \times M} w^j D^j(I_1, I_2).$$

Face Comparison with Multiple Images Per Person

In traditional face recognition tasks, faces of interest are recognized from only a few samples. However, in video based face recognition and verification, it is reasonable to assume that a large number of face images (frames) can be obtained from video data. With more information available, better verification accuracy is expected. In the present invention, some feature level and decision level aggregation strategies are applied by combining Chi-Square distances or decisions calculated from each image pair.

Let $S_1=\{I_1^m\}_{m=1}^{N_1}$ denote subject 1 consisting of $N_1$ face images $I_1^m$, m=1, ..., $N_1$ and let $S_2=\{I_2^n\}_{n=1}^{N_2}$ denote subject 2 consisting of $N_2$ face images $I_2^n$, n=1, ..., $N_2$, Chi-Square ($\chi^2$) distance between any $I_1^m$ and $I_2^n$ are firstly calculated, resulting in $N_1 \times N_2$ distances denoted as $D(I_1^m, I_2^n)$. These distances are then aggregated to give a final decision. Some combination strategies can be applied as below:

1. "Min( )" Operator
$S_1$ and $S_2$ are determined as the same person, if $$\min_{m=1,\ldots,N_1, n=1,\ldots,N_2} (D(I_1^m, I_2^n)) \leq T,$$

otherwise determined as different persons, where T is a pre-defined threshold. In an exemplary embodiment of the present invention, T is set to 4.0.

2. "Mean( )" Operator
$S_1$ and $S_2$ are determined as the same person, if $$\frac{1}{N_1 \times N_2} \sum_{m=1}^{N_1} \sum_{n=1}^{N_2} D(I_1^m, I_2^n) \leq T,$$

otherwise determined as different persons, where T is a pre-defined threshold. In an exemplary embodiment of the present invention, T is set to 4.5.

3. Majority Vote
$S_1$ and $S_2$ are determined as the same person, if $V_{same} \geq 0.5 \times N_1 \times N_2$, otherwise determined as different persons. $V_{same}$ is the number of votes as same person which is defined as $$V_{same} = \sum_{m=1}^{N_1} \sum_{n=1}^{N_2} b(I_1^m, I_2^n),$$

where $$b(I_1^m, I_2^n) = \begin{cases} 1 & \text{if } D(I_1^m, I_2^n) \leq T \\ 0 & \text{otherwise} \end{cases},$$

where T is a pre-defined threshold. In an exemplary embodiment of the present invention, T is set to 4.5.

In summary, the present invention performs face verification using video data. The system consists of two main modules: face image capturing and face verification. In the face image capturing module, good frontal face images are captured from input video data. A unique feature denoted as frontal face quality score discriminates between frontal and profile faces. In the face verification module, local binary pattern histogram was selected as the facial feature descriptor for its high discriminative power and computational efficiency. Chi-Square ($\chi^2$) distance between LBP histograms from two face images are then calculated as a face dissimilarity measure. The decision whether or not two images belong to the same person is then made by comparing the corresponding distance with a pre-defined threshold. Given the fact that more than one face image can be captured per person from video data, several feature based and decision based aggregators are applied to combine pair-wise distances to further improve the verification performance.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method for determining if an image of a face is a face candidate, where a face rectangle is defined as $\{x_f, y_f, h_f, w_f\}$, where $\{x_f, y_f\}$ are the coordinates of a left top point, $\{h_f, w_f\}$ are the height and width of the face rectangle, respectively, left and right eyes of the face are defined as $\{x_{le}, y_{le}, h_{le}, w_{le}\}$ and $\{x_{re}, y_{re}, h_{re}, w_{re}\}$ respectively, with $\{x_{le}, y_{le}\}$, $\{x_{re}, y_{re}\}$ being left top points of the coordinates of the left and right eyes, respectively, and $\{h_{le}, w_{le}\}$, $\{h_{re}, w_{re}\}$ being the height and width of the left and right eyes, respectively, and $\{h_I, w_I\}$ denotes the height and width of the image, respectively, comprising:

capturing an image of a face with an image capture device; and using a processor to determine if the face is a face candidate by examining the face for the following criteria:
(1) the face should appear in the middle of the image, such that $x_f \geq \theta_l \times w_I$, $x_f + w_f \leq \theta_r \times w_I$, $y_f \leq \theta_t \times h_I$, $y_f + h_f \leq \theta_b \times h_I$, where $0 \leq \theta_l, \theta_r, \theta_t, \theta_b \leq 1$ and $\theta_l, \theta_r, \theta_t, \theta_b$ are four pre-defined thresholds;
(2) the face should be sufficiently large, such that min $(h_f, w_f) \geq \theta_s \times \min(h_I, w_I)$, $\theta_s$ is a pre-defined threshold;
(3) the left and right eyes should be located in a horizontal line, such that $|y_{le} - y_{re}| \leq \max(\min(h_{le}, h_{re}) \times \gamma_1, 3)$ where $\gamma_1$ is a pre-defined threshold;

(4) the left and right eyes should have similar size, such that $|w_{le}-w_{re}| \leq \max(\min(w_{le},w_{re}) \times \gamma_2, 3)$, where $\gamma_2$ is a pre-defined threshold;

(5) a distance between the left and right eyes should be within a range, such that $w_f \times \gamma_3 < |x_{lc}^c - x_{rc}^c| < w_f \times \gamma_4$, where $x_{lc}^c$, $x_{rc}^c$ are x-coordinates of the left and right eye rectangle center points, respectively, and $\gamma_3$ and $\gamma_4$ are pre-defined thresholds;

(6) a size of the left and right eyes should be within a range, i.e., $\min(w_{le},w_{re}) \geq w_f \times \gamma_5$, $\max(w_{le},w_{re}) \leq w_f \times \gamma_6$, where $\gamma_5$ and $\gamma_6$ are pre-defined thresholds;

and (7) the left and right eyes should be located in the middle of the face, i.e., $x_f + w_f - x_{re} - w_{re} \geq w_{re} \times \gamma_7$, $x_{le} - x_f \geq w_{le} \times \gamma_8$, where $\gamma_7$ and $\gamma_8$ are pre-defined thresholds;

and outputs to an output device a result that the image of a face is a face candidate when the criteria (1) through (7) are met.

2. A method according to claim 1 wherein when a result that the image of a face is a face candidate the processor then calculates a frontal face quality score S that is defined as $$S = \frac{N}{h_f}$$

where $h_f$ denotes the height of face rectangle and N denotes the number of rows where a face contour is found in only one of a left and right part of the face rectangle.

3. A method according to claim 2 wherein the processor then calculates the frontal face quality score according to the following:

$$N = \sum_{y=y_f}^{y_f+h_f} |b^L_{contour}(y) - b^R_{contour}(y)|, \text{ where}$$

$$b^L_{contour}(y) = \begin{cases} 1 & \text{if } \sum_{x=x_f}^{x_f+\alpha_1 \times w_f} Edge_{R|G|B}(x,y) > 0 \\ 0 & \text{if } \sum_{x=x_f}^{x_f+\alpha_1 \times w_f} Edge_{R|G|B}(x,y) = 0 \end{cases}, \text{ and}$$

$$b^R_{contour}(y) = \begin{cases} 1 & \text{if } \sum_{x=x_f+w_f-\alpha_2 \times w}^{x_f+w_f} Edge_{R|G|B}(x,y) > 0 \\ 0 & \text{if } \sum_{x=x_f+w_f-\alpha_2 \times w}^{x_f+w_f} Edge_{R|G|B}(x,y) = 0 \end{cases} \text{ where}$$

$Edge_{R|G|B}(x,y) = Edge_R(x,y) | Edge_G(x,y) | Edge_B(x,y)$ denotes the binary edge map obtained by combining binary vertical edge maps from R, G, and B channels, and "|" denotes an "OR" operator, and $\alpha_1$, $\alpha_2$ are two pre-defined constants defining a left and right rectangle range, respectively.

4. A method according to claim 2 wherein a plurality of images of a face are captured and the processor determines a result that the image of a face is a face candidate for the plurality of images and the processor calculates a frontal face quality score S for a plurality of face candidates, and the processor then sorts the quality scores and outputs k faces with the smallest scores for storage in a registration session or comparison with other faces in a face verification session.

5. A method according to claim 4 wherein during the face verification session the processor calculates a Local Binary Pattern (LBP) histogram $H_1$ for at least a first frontal face $I_1$ and a Local Binary Pattern (LBP) histogram $H_2$ for at least a second frontal face $I_2$.

6. A method according to claim 5 wherein the processor compares the first and second frontal face images $I_1$, $I_2$ by calculating the Chi-Square ($\chi^2$) distance between two LBP histograms, denoted as $D(I_1,I_2)$, and the processor compares $D(I_1,I_2)$ to a pre-defined threshold T and determines that the first and second frontal face images $I_1$, $I_2$ belong to one person if $D(I_1,I_2) \leq T$, and otherwise determines that the first and second frontal face images $I_1$, $I_2$ belong to different persons, and outputs to an output device a result that the first and second frontal face images $I_1$, $I_2$ belong to one person or to different persons.

7. A method according to claim 5 wherein the processor calculates a weighted Local Binary Pattern (LBP) histogram for the first frontal face $I_1$ and a weighted Local Binary Pattern (LBP) histogram $H_2$ for the second frontal face $I_2$.

8. A method according to claim 7 wherein the processor applies a support vector machine (SVM) technique to obtain weights from training samples to calculate the weighted Local Binary Pattern (LBP) histograms.

9. A method according to claim 6 wherein the processor compares a first number $N_1$ of frontal face images of a first subject 1 to a second number of $N_2$ face images of a second subject 2, where $S_1 = \{I_1^m\}_{m=1}^{N_1}$ denotes subject 1 consisting of $N_1$ face images $I_1^m$, m=1, ..., $N_1$ and $S_2 = \{I_2^n\}_{n=1}^{N_2}$ denotes subject 2 consisting of $N_2$ face images $I_2^n$, n=1, ..., $N_2$, and the processor calculates a Chi-Square ($\chi^2$) distance between any $I_1^m$ and $I_2^n$, resulting in $N_1 \times N_2$ distances denoted as $D(I_1^m, I_2^n)$, and the processor aggregates these distances and then determines that $S_1$ and $S_2$ are a same person if $$\min_{m=1,\ldots,N_1, n=1,\ldots,N_2} (D(I_1^m, I_2^n)) \leq T,$$

otherwise the processor determines that $S_1$ and $S_2$ are different persons, where T is a pre-defined threshold, and the processor outputs the determination that that $S_1$ and $S_2$ are the same or different persons to an output device.

10. A method according to claim 6 wherein the processor compares a first number $N_1$ of frontal face images of a first subject 1 to a second number of $N_2$ face images of a second subject 2, where $S_1 = \{I_1^m\}_{m=1}^{N_1}$ denotes subject 1 consisting of $N_1$ face images $I_1^m$, m=1, ..., $N_1$ and $S_2 = \{I_2^n\}_{n=1}^{N_2}$ denotes subject 2 consisting of $N_2$ face images $I_2^n$, n=1, ..., $N_2$, and the processor calculates a Chi-Square ($\chi^2$) distance between any $I_1^m$ and $I_2^n$, resulting in $N_1 \times N_2$ distances denoted as $D(I_1^m, I_2^n)$, and the processor aggregates these distances and then determines that $S_1$ and $S_2$ are a same person if $$\frac{1}{N_1 \times N_2} \sum_{m=1}^{N_1} \sum_{n=1}^{N_2} D(I_1^m, I_2^n) \leq T,$$

where T is a pre-defined threshold otherwise the processor determines that $S_1$ and $S_2$ are different persons, and the processor outputs the determination that that $S_1$ and $S_2$ are the same or different persons to an output device.

11. A method according to claim 6 wherein the processor compares a first number $N_1$ of frontal face images of a first subject 1 to a second number of $N_2$ face images of a second subject 2, where $S_1=\{I_1^m\}_{m=1}^{N_1}$ denotes subject 1 consisting of $N_1$ face images $I_1^m$, $m=1, \ldots, N_1$ and $S_2=\{I_2^n\}_{n=1}^{N_2}$ denotes subject 2 consisting of $N_2$ face images $I_2^n$, $n=1, \ldots, N_2$, and the processor calculates a Chi-Square ($\chi^2$) distance between any $I_1^m$ and $I_2^n$, resulting in $N_1 \times N_2$ distances denoted as $D(I_1^m, I_2^n)$, and the processor aggregates these distances and then determines that $S_1$ and $S_2$ are a same person if $V_{same} \geq 0.5 \times N_1 \times N_2$, otherwise the processor determines that $S_1$ and $S_2$ are different persons, where $V_{same}$ is the number of votes as same person which is defined as $$V_{same} = \sum_{m=1}^{N_1} \sum_{n=1}^{N_2} b(I_1^m, I_2^n),$$

where $$b(I_1^m, I_2^n) = \begin{cases} 1 & \text{if } D(I_1^m, I_2^n) \leq T \\ 0 & \text{otherwise,} \end{cases}$$

where T is a pre-defined threshold, and the processor outputs the determination that that $S_1$ and $S_2$ are the same or different persons to an output device.

12. A device for determining if an image of a face is a face candidate, where a face rectangle is defined as $\{x_f, y_f, h_f, w_f\}$, where $\{x_f, y_f\}$ are the coordinates of a left top point, $\{h_f, w_f\}$ are the height and width of the face rectangle, respectively, left and right eyes of the face are defined as $\{x_{le}, y_{le}, h_{le}, w_{le}\}$ and $\{x_{re}, y_{re}, h_{re}, w_{re}\}$ respectively, with $\{x_{le}, y_{le}\}$, $\{x_{re}, y_{re}\}$ being the coordinates of the left and right eyes, respectively, and $\{h_{le}, w_{le}\}$, $\{h_{re}, w_{re}\}$ being the height and width of the left and right eyes, respectively, and $\{h_I, w_I\}$ denotes the height and width of the image, respectively, comprising:

an image capture device that captures an image of a face; and a processor that determines if the face is a face candidate by examining the face for the following criteria:

(1) the face should appear in the middle of the image, such that $x_f \geq \theta_l \times w_I$, $x_f + w_f \leq \theta_r \times w_I$, $y_f \leq \theta_t \times h_I$, $y_f + h_f \leq \theta_b \times h_I$, where $0 \leq \theta_l, \theta_r, \theta_t, \theta_b \leq 1$ and $\theta_l, \theta_r, \theta_t, \theta_b$ are four pre-defined thresholds;

(2) the face should be sufficiently large, such that min $(h_f, w_f) \geq \theta_s \times \min(h_I, w_I)$, $\theta_s$ is a pre-defined threshold;

(3) the left and right eyes should be located in a horizontal line, such that $|y_{le} - y_{re}| \leq \max(\min(h_{le}, h_{re}) \times \gamma_1, 3)$ where $\gamma_1$ is a pre-defined threshold;

(4) the left and right eyes should have similar size, such that $|w_{le} - w_{re}| \leq \max(\min(w_{le}, w_{re}) \times \gamma_2, 3)$, where $\gamma_2$ is a pre-defined threshold;

(5) a distance between the left and eyes should be within a range, such that $w_f \times \gamma_3 < |x_{lc}^c - x_{rc}^c| < w_f \times \gamma_4$, where $x_{lc}^c$, $x_{rc}^c$ are x-coordinates of the left and right eye rectangle center points, respectively, and $\gamma_3$ and $\gamma_4$ are pre-defined thresholds;

(6) a size of the left and right eyes should be within a range, i.e., $\min(w_{le}, w_{re}) \geq w_f \times \gamma_5$, $\max(w_{le}, w_{re}) \leq w_f \times \gamma_6$, where $\gamma_5$ and $\gamma_6$ are pre-defined thresholds;

and (7) the left and right eyes should be located in the middle of the face, i.e., $x_f + w_f - x_{re} - w_{re} \geq w_{re} \times \gamma_7$, $x_{le} - x_f \geq w_{le} \times \gamma_8$, where $\gamma_7$ and $\gamma_8$ are pre-defined thresholds;

and an output device that receives a result from the processor that the image of a face is a face candidate when the criteria (1) through (7) are met.

13. A device according to claim 12 wherein when a result that the image of a face is a face candidate the processor then calculates a frontal face quality score S that is defined as $$S = \frac{N}{h_f}$$

where $h_f$ denotes the height of face rectangle and N denotes the number of rows where a face contour is found in only one of a left and right part of the face rectangle.

14. A device according to claim 13 wherein the processor then calculates the frontal face quality score according to the following:

$$N = \sum_{y=y_f}^{y_f+h_f} |b_{contour}^L(y) - b_{contour}^R(y)|, \text{ where}$$

$$b_{contour}^L(y) = \begin{cases} 1 & \text{if } \sum_{x=x_f}^{x_f+a_1 \times w_f} Edge_{R|G|B}(x, y) > 0 \\ 0 & \text{if } \sum_{x=x_f}^{x_f+a_1 \times w_f} Edge_{R|G|B}(x, y) = 0 \end{cases}, \text{ and}$$

$$b_{contour}^R(y) = \begin{cases} 1 & \text{if } \sum_{x=x_f+w_f-a_2 \times w}^{x_f+w_f} Edge_{R|G|B}(x, y) > 0 \\ 0 & \text{if } \sum_{x=x_f+w_f-a_2 \times w}^{x_f+w_f} Edge_{R|G|B}(x, y) = 0 \end{cases} \text{ where}$$

$Edge_{R|G|B}(x,y) = Edge_R(x,y) | Edge_G(x,y) | Edge_B(x,y)$ denotes the binary edge map obtained by combining binary vertical edge maps from R, G, and B channels, and "|" denotes an "OR" operator, and $\alpha_1$, $\alpha_2$ are two pre-defined constants defining a left and right rectangle range, respectively.

15. A device according to claim 13 further comprising a storage device, and wherein the image capture device captures a plurality of images of a face and the processor determines a result that the image of a face is a face candidate for the plurality of images and the processor calculates a frontal face quality score S for a plurality of face candidates, and the processor then sorts the quality scores and outputs k faces with the smallest scores for storage in the storage device in a registration session or for comparison with other faces in a face verification session.

16. A device according to claim 15 wherein during the face verification session the processor calculates a Local Binary Pattern (LBP) histogram $H_1$ for at least a first frontal face $I_1$ and a Local Binary Pattern (LBP) histogram $H_2$ for at least a second frontal face $I_2$.

17. One or more tangible computer-readable media having computer-readable instructions thereon, which, when executed by a processor determine if an image of a face is a face candidate, where a face rectangle is defined as $\{x_f, y_f, h_f, w_f\}$, where $\{x_f, y_f\}$ are the coordinates of a left top point, $\{h_f, w_f\}$ are the height and width of the face rectangle, respectively, left and right eyes of the face are defined as $\{x_{le}, y_{le}, h_{le}, w_{le}\}$ and $\{x_{re}, y_{re}, h_{re}, w_{re}\}$ respectively, with $\{x_{le}, y_{le}\}$, $\{x_{re}, y_{re}\}$ being the coordinates of the left and right eyes, respectively, and $\{h_{le}, w_{le}\}$, $\{h_{re}, w_{re}\}$ being the height and width of the left and right eyes, respectively, and $\{h_I, w_I\}$ denotes the height and width of the image, respectively, wherein:

the processor determines if the face is a face candidate by examining the face for the following criteria:

(1) the face should appear in the middle of the image, such that $x_f \geq \theta_l \times w_I$, $x_f + w_f \leq \theta_r \times w_I$, $y_f \leq \theta_t \times h_I$, $y_f + h_f \leq \theta_b \times h_I$, where $0 \leq \theta_l, \theta_r, \theta_t, \theta_b \leq 1$ and $\theta_l, \theta_r, \theta_t, \theta_b$ are four pre-defined thresholds;

(2) the face should be sufficiently large, such that $\min(h_f, w_f) \geq \theta_s \times \min(h_I, w_I)$, $\theta_s$ is a pre-defined threshold;

(3) the left and right eyes should be located in a horizontal line, such that $|y_{le} - y_{re}| \leq \max(\min(h_{le}, h_{re}) \times \gamma_1, 3)$ where $\gamma_1$ is a pre-defined threshold;

(4) the left and right eyes should have similar size, such that $|w_{le} - w_{re}| \leq \max(\min(w_{le}, w_{re}) \times \gamma_2, 3)$, where $\gamma_2$ is a pre-defined threshold;

(5) a distance between the left and eyes should be within a range, such that $w_f \times \gamma_3 < |x_{lc}^c - x_{rc}^c| < w_f \times \gamma_4$, where $x_{lc}^c, x_{rc}^c$ are x-coordinates of the left and right eye rectangle center points, respectively, and $\gamma_3$ and $\gamma_4$ are pre-defined thresholds;

(6) a size of the left and right eyes should be within a range, i.e., $\min(w_{le}, w_{re}) \geq w_f \times \gamma_5$, $\max(w_{le}, w_{re}) \leq w_f \times \gamma_6$, where $\gamma_5$ and $\gamma_6$ are pre-defined thresholds;

and (7) the left and right eyes should be located in the middle of the face, i.e., $x_f + w_f - x_{re} - w_{re} \geq w_{re} \times \gamma_7$, $x_{le} - x_f \geq w_{le} \times \gamma_8$, where $\gamma_7$ and $\gamma_8$ are pre-defined thresholds;

and the processor outputs to an output device a result that the image of a face is a face candidate when the criteria (1) through (7) are met.

18. The one or more non-transitory computer-readable media according to claim 17 wherein when a result that the image of a face is a face candidate the processor then calculates a frontal face quality score S that is defined as $$S = \frac{N}{h_f}$$

where $h_f$ denotes the height of face rectangle and N denotes the number of rows where a face contour is found in only one of a left and right part of the face rectangle.

19. The one or more non-transitory computer-readable media according to claim 18 wherein the processor then calculates the frontal face quality score according to the following:

$$N = \sum_{y=y_f}^{y_f+h_f} |b_{contour}^L(y) - b_{contour}^R(y)|, \text{ where}$$

$$b_{contour}^L(y) = \begin{cases} 1 & \text{if } \sum_{x=x_f}^{x_f+\alpha_1 \times w_f} Edge_{R|G|B}(x, y) > 0 \\ 0 & \text{if } \sum_{x=x_f}^{x_f+\alpha_1 \times w_f} Edge_{R|G|B}(x, y) = 0 \end{cases}, \text{ and}$$

$$b_{contour}^R(y) = \begin{cases} 1 & \text{if } \sum_{x=x_f+w_f-\alpha_2 \times w}^{x_f+w_f} Edge_{R|G|B}(x, y) > 0 \\ 0 & \text{if } \sum_{x=x_f+w_f-\alpha_2 \times w}^{x_f+w_f} Edge_{R|G|B}(x, y) = 0 \end{cases} \text{ where}$$

$Edge_{R|G|B}(x,y) = Edge_R(x,y) | Edge_G(x,y) | Edge_B(x,y)$ denotes the binary edge map obtained by combining binary vertical edge maps from R, G, and B channels, and "|" denotes an "OR" operator, and $\alpha_1, \alpha_2$ are two pre-defined constants defining a left and right rectangle range, respectively.

20. The one or more non-transitory computer-readable media according to claim 18 wherein the processor determines a result that the image of a face is a face candidate for a plurality of images and the processor calculates a frontal face quality score S for a plurality of face candidates, and the processor then sorts the quality scores and outputs k faces with the smallest scores for storage in a registration session or comparison with other faces in a face verification session.

* * * * *